(12) United States Patent
Jung

(10) Patent No.: US 11,507,230 B2
(45) Date of Patent: Nov. 22, 2022

(54) HYBRID SENSOR FOR DETECTING TOUCH AND TOUCH FORCE AND METHOD OF OPERATING SAME

(71) Applicant: DAMOATECH CO., LTD., Seongnam-si (KR)

(72) Inventor: Hu Min Jung, Hanam-si (KR)

(73) Assignee: DAMOATECH CO., LTD., Seongnam-si (KR)

( * ) Notice: Subject to any disclaimer, the term of this patent is extended or adjusted under 35 U.S.C. 154(b) by 0 days.

(21) Appl. No.: 17/566,968

(22) Filed: Dec. 31, 2021

(65) Prior Publication Data

US 2022/0206602 A1 Jun. 30, 2022

(30) Foreign Application Priority Data

Dec. 31, 2020 (KR) .................. 10-2020-0189922

(51) Int. Cl.
*G06F 3/044* (2006.01)

(52) U.S. Cl.
CPC .... *G06F 3/044* (2013.01); *G06F 2203/04105* (2013.01)

(58) Field of Classification Search
CPC .......... G06F 3/044; G06F 3/0414; G06F 3/02; G06F 2203/04105; G06K 9/0002
See application file for complete search history.

(56) References Cited

U.S. PATENT DOCUMENTS

| | | | |
|---|---|---|---|
| 9,870,109 | B2 | 1/2018 | Bulea et al. |
| 9,990,121 | B2 | 6/2018 | Cieplinski et al. |
| 2017/0016255 | A1 | 1/2017 | Guibbert et al. |
| 2017/0269754 | A1 | 9/2017 | Liu |
| 2020/0400513 | A1 | 12/2020 | Jung |
| 2021/0157424 | A1* | 5/2021 | Lee .................. G06F 3/044 |
| 2021/0181873 | A1* | 6/2021 | Lee .................. G06F 3/046 |

FOREIGN PATENT DOCUMENTS

| | | |
|---|---|---|
| KR | 10-2917-0007127 A1 | 1/2017 |
| KR | 10-1697975 B1 | 1/2017 |
| KR | 10-1920440 B1 | 11/2018 |
| KR | 10-1954368 B1 | 3/2019 |
| KR | 10-2185046 B1 | 12/2020 |

* cited by examiner

*Primary Examiner* — Hong Zhou
(74) *Attorney, Agent, or Firm* — United One Law Group LLC; Kongsik Kim; Jhongwoo Peck

(57) ABSTRACT

Disclosed herein are a hybrid sensor and a method of operating the same. The hybrid sensor includes: a first sensing element located on the outer side of the hybrid sensor; a second sensing element disposed to face the first sensing element; a deformable intermediate part disposed between the first sensing element and the second sensing element; a first resonant circuit electrically connected to the second sensing element; a second resonant circuit; and a detection circuit configured to receive a first electrical signal formed in the first resonant circuit and the second sensing element, and a second electrical signal formed in the second resonant circuit. The detection circuit generates sensing information. It is determined whether the sensing information is caused based on the displacement of the first sensing element attributable to a user motion.

14 Claims, 8 Drawing Sheets

HYBRID SENSOR FOR DETECTING TOUCH AND TOUCH FORCE AND METHOD OF OPERATING SAME

CROSS-REFERENCE TO RELATED APPLICATION

This application claims priority to Korean Patent Application No. 10-2020-0189922 filed on Dec. 31, 2020, which is incorporated herein by reference in its entirety.

TECHNICAL FIELD

The present invention generally relates to a proximity-based user interface device, a sensor for the device, and a method of operating the same. More particularly, the present invention relates to technology for improving and effectively implementing the sensitivity of a proximity-based gesture sensor, touch sensor, and touch force sensor, and technology for a method of operating the same.

RELATED ART

Recently, touch recognition technology has made rapid progress. In two-dimensional (2D) touch recognition technology that recognizes a touch location using coordinates on X and Y axes, there has emerged a three-dimensional (3D) touch recognition function that enhances a user interface by detecting the intensity of touch (the amount of force applied in a Z-axis direction) rather than simply determining whether a touch is made.

Apple Inc.'s 3D touch has introduced a technology that combines a touch sensor and a pressure sensor with each other, thereby recognizing the intensity of touch in a differentiated manner. However, the method of combining a touch sensor and a pressure sensor increases hardware manufacturing cost, and has difficulty in accurately recognizing the intensity of a user's touch because the sensitivity of the pressure sensor is not sufficiently high.

As related art for detecting a user's intention to lock or unlock a car door by detecting a force applied to the car door by applying the 3D touch force recognition technology, there are disclosed Korean Patent Application Publication No. 10-2017-0007127 and U.S. Patent Application Publication No. US 2017/0016255 entitled "Device for Detecting a User's Intention to Lock or Unlock a Motor Vehicle Door." The detection device D' of this related art document is designed to measure the movement of a target indicative of a user's pressure in a locking area adapted to lock a vehicle at a considerably small distance (from 20 to 100 μm). Although the sensitivity is increased to detect a change at a considerably small distance, the dynamic range within which measurement can be made is considerably narrow.

Texas Instruments Inc.'s U.S. Patent Application Publication No. US 2017/0269754 discloses a "Dual Touch Sensor Architecture With XY-Position And Z-Force Sensing For Touch-On-Surface Button" configured such that a capacitive touch sensor 28 and an inductive touch force sensor 29 are combined with each other, whether a touch is made and the location of the touch on an XY plane are recognized by the capacitive touch sensor 28, and the force of the touch at the touch location in a Z-axis direction is recognized by the inductive sensor 29, as shown in FIG. 1. However, as shown in FIG. 1, this related art requires a conductive wire electrically connected to an external electrode 21 for the operation of the capacitive touch sensor 28, so that there are problems in that the structure is complicated and it is difficult to apply the related art to applications requiring airtightness and/or waterproofness.

As related art for implementing an inductive force sensor by implementing a coil on an FPCB, there are introduced Korean Patent No. 10-1920440 entitled "Self-Inductive Force Sensor Module for 3D Touch Implementation," and Korean Patent No. 10-1954368 entitled "Mutual Inductive Force Sensor Module for 3D Touch Implementation."

U.S. Pat. No. 9,990,121 entitled "Device, Method, and Graphical User Interface for Moving a User Interface Object based on an Intensity of a Press Input" does not disclose a specific process for implementing a circuit. However, the first gesture recognizer is an intensity-based gesture recognizer, the second gesture recognizer is a tap gesture recognizer, and the third gesture recognizer is a recognizer that detects a second input subsequent gesture following a first input. A configuration is disclosed in which a separate recognizer sensor is used for each threshold and type of gesture.

U.S. Pat. No. 9,870,109 entitled "Device and Method for Localized Force and Proximity Sensing" discloses a location sensing mode in which a ground trace electrode other than a touch electrode is maintained in a ground state to recognize touch location information, and uses a ground trace electrode as a receiver electrode in order to recognize a touch force. Although this method has the advantage of reducing the number of electrodes for recognizing a touch and a touch force, it still requires separate channels for the sensing of a touch and the measurement of a touch force and needs to operate in a touch location sensing mode and a touch force sensing mode that are separate from each other.

Korean Patent No. 10-1697975 entitled "Inductance-type Displacement sensor using Frequency Modulation" discloses a technology for measuring the displacement of a component as an inductance sensor using a change in the difference between resonant frequencies.

Korean Patent No. 10-2185046 entitled "Switching Operation Sensing Device and Electronic Device capable of recognizing Touch Target" discloses z sensor that utilizes a changing phenomenon in which either an inductive response or a capacitive response is applied to a single action of the user and, in this case, a resonant frequency is changed by a touch. However, this related art is problematic in that the response is slow because it uses a method of counting a resonant frequency within a time interval.

The related art for detecting a touch force using an inductive sensor introduce a technology for recognizing touch force through the arrangement of parts or components or the selection of a new material or component such as a FPCB. However, when only an inductive sensor is used, a dynamic range for detecting a touch location and a touch force is low, or the precision decreases when the dynamic range is increased. When an inductive sensor is combined with another sensor, there is a problem in that hardware cost increases. In addition, when a plurality of types of sensors is combined together, wiring is complicated, which increases hardware cost, and it is difficult to apply this case to applications requiring airtightness and waterproofness.

Furthermore, due to the recent emergence of mobile devices and smart devices, there are various needs for user interfaces and user experiences. In order to meet these needs, there is a demand for technology capable of recognizing a touch force for each minute area. For this purpose, there is required technology in which touch sensors/touch force sensors are densely arranged and the individual sensors are recognized separately. However, it is difficult for the related art to meet these requirements.

Meanwhile, the related art is problematic in that power consumption increases and it is difficult to make a rapid response because individual channels are allocated to respective targets to be identified (whether a touch occurs, the location of the touch, whether a touch force is input, and the intensity of the touch force), individual operation modes are also assigned, and then operation is performed.

SUMMARY

Although the related art provides technology for detecting a touch/proximity sensing-based user gesture for various applications, they are problematic in that power consumption increases and it is difficult to respond rapidly because they allocate individual operation modes for respective targets to be identified (whether a touch occurs, the location of the touch, whether a touch force is input, and the intensity of the touch force) and then operate.

An object of the present invention is to provide a technology that may detect whether a user makes a touch, whether the user inputs a touch force, and the intensity of the touch force and track changes in the touch and the touch force as a gesture over time via a hybrid sensor configuration based on a single channel and a single operation mode, thereby accurately detecting a user motion input to a device via the single operation mode of a single channel sensor.

An object of the present invention is to reduce power consumption and sensing time by detecting whether a user touches an individual region, whether the user inputs a touch force, and the intensity of a touch force through single measurement without a frequency component scan.

An object of the present invention is to provide a user interface for detecting changes in time and frequency domains and recognizing a gesture using a hybrid sensor of a single channel and a single operation mode. An object of the present invention is to provide a gesture sensor that may easily detect changes in time and frequency domains without requiring a variable frequency scan and does not need to change an operation mode according to a target to be detected, thereby obtaining continuous sensing information in real time while maintaining the setting of a sensing circuit as a single setting.

An object of the present invention is to provide a user interface that may translate a gesture represented by a user motion and an input intended by a user by rapidly detecting the details of the user motion (whether a user makes a touch, whether the user inputs a touch force, and the intensity of the touch force) for an individual region through real-time continuous sensing.

An object of the present invention is to provide a user interface that may translate a gesture represented by a user motion and an input intended by a user by rapidly detecting various aspects of the user motion through single setting-based sensing.

According to an aspect of the present invention, there is provided a hybrid sensor including: a first sensing element located on the outer side of the hybrid sensor; a second sensing element disposed to face the first sensing element; a deformable intermediate part disposed between the first sensing element and the second sensing element; a first resonant circuit electrically connected to the second sensing element; a second resonant circuit having the same electrical characteristics as the first resonant circuit; and a detection circuit configured to receive a first electrical signal formed in the first resonant circuit and the second sensing element, and a second electrical signal formed in the second resonant circuit.

The detection circuit is further configured to generate sensing information by detecting the difference between the first resonant frequency of the first electrical signal and the second resonant frequency of the second electrical signal. Whether a change in the sensing information is caused based on the displacement of the first sensing element attributable to a user motion is determined based on the magnitude of the change in the sensing information over time.

When an external conductor touches the first sensing element due to the user motion, whether the external conductor inputs a touch force to the first sensing element due to the user motion may be determined based on the result of the determination of whether the change in the sensing information is caused based on the displacement of the first sensing element attributable to the user motion, which is performed based on the magnitude of the change in the sensing information over time.

When the external conductor inputs the touch force to the first sensing element, the intensity of the touch force input to the first sensing element by the external conductor may be determined based on the magnitude of the change in the sensing information.

The first sensing element may be a conductive target, and the second sensing element may be an inductive coil. When the change in the sensing information is not caused based on the displacement of the first sensing element, the sensing information may be changed based on the capacitive coupling between the inductive coil and an external conductor passing through the conductive target. When the sensing information and/or the change in the sensing information is caused based on the displacement of the first sensing element, the sensing information and/or the change in the sensing information may be affected by the inductive coupling between the conductive target and the inductive coil.

The first sensing element may be a floating first electrode, and the second sensing element may be a second electrode. When the change in the sensing information is not caused based on the displacement of the first sensing element, the sensing information may be changed based on the capacitive coupling between an external conductor approaching due to the user motion and the first electrode. When the change in the sensing information is caused based on the displacement of the first sensing element, the sensing information may be changed based on the capacitive coupling between the first electrode and the second electrode.

The detection circuit may be further configured to output an output signal proportional to the magnitude of the sensing information while having a value that changes based on the polarity of the sensing information.

The hybrid sensor may further include a controller configured to determine whether the change in the sensed information is caused based on the displacement of the first sensing element attributable to the user motion based on the magnitude of the change in the sensing information over time, and to, when an external conductor touches the first sensing element due to the user motion, determine whether the external conductor inputs a touch force to the first sensing element due to the user motion based on the result of the determination of whether the change in the sensing information is caused based on the displacement of the first sensing element attributable to the user motion, which is performed based on the magnitude of the change in the sensing information over time.

The detection circuit may be further configured to detect the magnitude of the sensing information over time while maintaining the electrical characteristics of the first resonant circuit and the second resonant circuit as a single setting.

The detection circuit may comprise: an operator configured to obtain the difference between the first resonant frequency and the second resonant frequency; a low-pass filter connected to the output terminal of the operator, and configured to remove a high frequency component; and an output signal generator connected to the output terminal of the low-pass filter, and configured to generate an electrical signal proportional to the magnitude of the sensing information according to the polarity thereof.

According to another aspect of the present invention, there is provided a user interface device including a hybrid sensor and a controller; wherein the hybrid sensor includes a first sensing element located on the outer side of the hybrid sensor, a second sensing element disposed to face the first sensing element, a first resonant circuit electrically connected to the second sensing element, a second resonant circuit having the same electrical characteristics as the first resonant circuit, a deformable intermediate part disposed between the first sensing element and the second sensing element, and a detection circuit configured to receive a first electrical signal formed in the first resonant circuit and the second sensing element, and a second electrical signal formed in the second resonant circuit.

The detection circuit is further configured to generate sensing information by detecting a difference between a first resonant frequency of the first electrical signal and a second resonant frequency of the second electrical signal. The controller is configured to determine whether a change in the sensing information is caused based on the displacement of the first sensing element attributable to the user motion based on the magnitude of the change in the sensing information over time.

The controller may be further configured to, when an external conductor touches the first sensing element due to the user motion, track whether the external conductor inputs a touch force to the first sensing element due to the user motion based on the result of the determination of whether the change in the sensing information is caused based on the displacement of the first sensing element attributable to a user motion, which is performed based on the magnitude of the change in the sensing information over time.

The controller may be further configured to recognize a gesture represented by the user motion based on the result of the tracking, and to translate the gesture as a user input intended by the user motion.

The controller may be further configured to, when the external conductor inputs the touch force to the first sensing element, determine the intensity of the touch force, input to the first sensing element by the external conductor, based on the magnitude of the change in the sensing information over time.

The controller may be further configured to recognize a gesture represented by the user motion based on the intensity of the touch force, and to translate the gesture as a user input intended by the user motion.

According to still another aspect of the present invention, there is provided a method of operating a hybrid sensor, the method including: receiving, by a detection circuit, a first electrical signal formed in a first resonant circuit and a second sensing element electrically connected to the first resonant circuit and disposed to face the first sensing element; receiving, by the detection circuit, a second electrical signal formed in a second resonant circuit; generating, by the detection circuit, sensing information by detecting the difference between the first resonant frequency of the first electrical signal and the second resonant frequency of a second electrical signal; and determining, by a controller or the detection circuit, whether a change in the sensing information is caused based on the displacement of the first sensing element attributable to the user motion based on the magnitude of the change in the sensing information over time.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
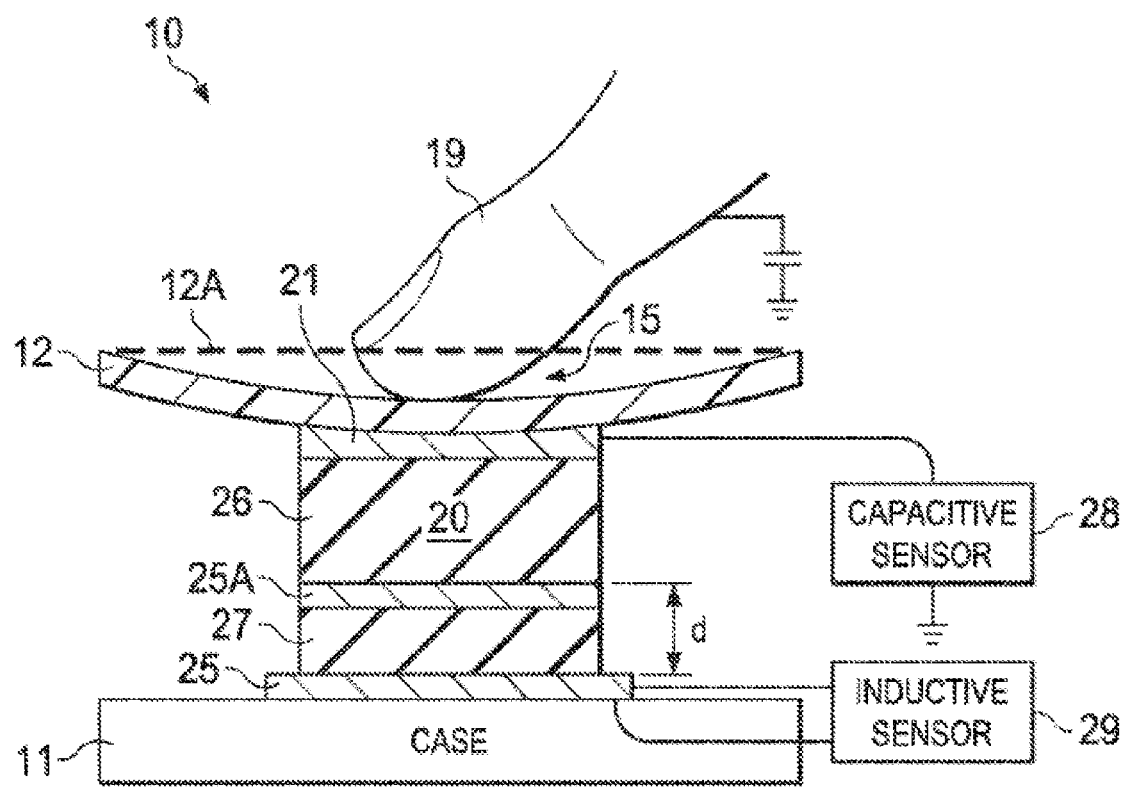
FIG. 1 is a diagram showing a dual touch sensor in which a conventional capacitive touch sensor and a conventional inductive touch force sensor are combined with each other.

Objects and features of the present invention other than the above objects will be apparent from the following description of embodiments given with reference to the accompanying drawings. Embodiments of the present invention will be described in detail below with reference to the accompanying drawings. In the following description, when it is determined that a detailed description of a related known component or function may unnecessarily make the gist of the present invention obscure, it will be omitted.

Korean Patent Application Publication No. 10-2017-0007127 entitled "Device for Detecting User's Intention to Lock or Unlock Car Door," U.S. Patent Application Publication No. US 2017/0016255 entitled "Device for Detecting a User's Intention to Lock or Unlock a Motor Vehicle Door," U.S. Patent Application Publication No. US 2017/0269754 entitled "Dual Touch Sensor Architecture With XY-Position And Z-Force Sensing For Touch-On-Surface Button," Korean Patent No. 10-1920440 entitled "Self-Inductive Force Sensor Module for 3D Touch Implementation," Korean Patent No. 10-1954368 entitled "Mutual Inductive Force Sensor Module for 3D Touch Implementation," U.S. Pat. No. 9,990,121 entitled "Device, Method, and Graphical User Interface for Moving a User Interface Object based on an Intensity of a Press Input," U.S. Pat. No. 9,870,109 entitled "Device and Method for Localized Force and Proximity Sensing," Korean Patent No. 10-1697975 entitled "Inductance-type Displacement sensor using Frequency Modulation," and Korean Patent No. 10-2185046 entitled "Switching Operation Sensing Device and Electronic Device capable of recognizing Touch Target," which are the aforementioned related art documents, disclose technologies related to the present invention.

The technologies disclosed in the related art documents are partially related to the objects of the present invention, and some of the solutions employed by the present invention may be borrowed from the related technologies.

Only the same items included to embody the present invention among the items disclosed in the related art documents will be considered to be parts of the configuration of the present invention. In addition, detailed descriptions of the items obvious to those of ordinary skill in the art through the related art documents among the items necessary for embodying the present invention will be omitted in this specification.

The aforementioned related art documents disclose various applications that can utilize a user interface using hybrid sensing technology obtained based on the configuration of the present invention. Detailed descriptions of these applications will be omitted herein. However, although the technologies disclosed in the related art documents propose haptic feedback or a user interface for smartphones, the configuration of the present invention may be applied to various applications that provide the translation of user input using touch- or proximity-based user motion sensing information, and visual, auditory, olfactory, tactile, gustatory, or synesthetic feedback presented in response to the translation of the user input.

A hybrid sensor, a user interface device, and a method of operating the same according to embodiments of the present invention will be described in detail below with reference to the accompanying FIGS. 2 to 8.

Figure 2:
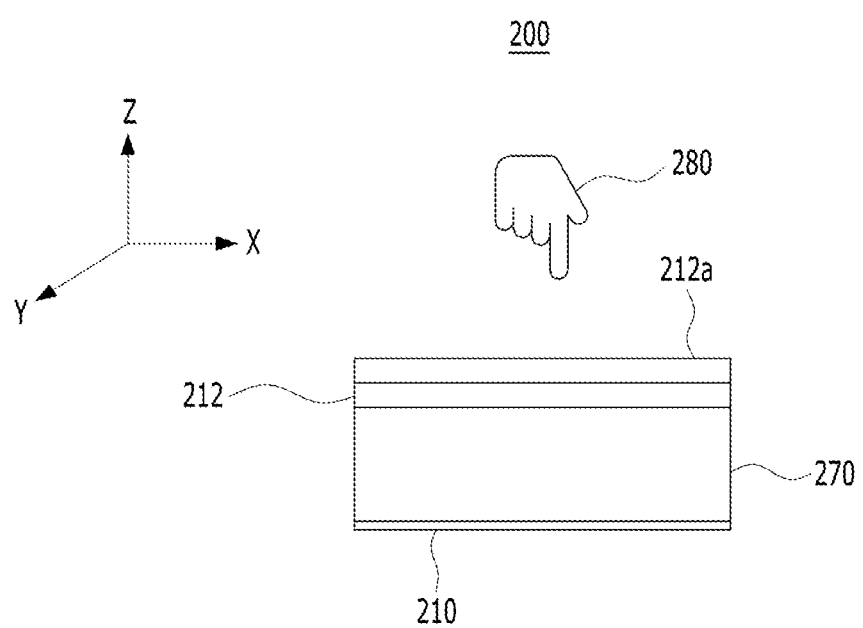
FIG. 2 is a diagram showing an overview of a user interface device based on inductive sensing according to an embodiment of the present invention.

FIG. 2 is a diagram showing an overview of a user interface device 200 based on inductive sensing according to an embodiment of the present invention.

Referring to FIG. 2, the inside of the user interface device 200 may be divided into one or more individual regions. At least one sensing channel may be disposed to correspond to each of the individual regions.

According to an embodiment, the inside of the user interface device 200 may be divided into a single region, and a single channel may be set and allocated to the single region.

FIG. 2 shows the user interface device 200 based on inductive sensing. The user interface device 200 includes a first conductive target 212 directed toward the outside to receive user input, and a deformable intermediate part 270 located between the conductive target 212 and an inductive coil 210. The intermediate part 270 is made of a material deformable by an external force, may include, e.g., at least one of plastic, silicone, and rubber, and may be replaced with a structure such as a spring.

Although one sensing channel is shown in FIG. 2, a plurality of sensing channels may be included on an XY plane according to an embodiment of the present invention. In this case, the individual sensing channels are divided into individual regions on the XY plane, and may be disposed to correspond to the individual regions, respectively.

An external conductor (a part of a user's body or an additional interface device such as a stylus) 280 may approach the user interface device 200 by a user proximity motion. The inductive coil 210 corresponding to each of the individual regions generates sensing information corresponding to whether the external conductor 280 touches the conductive target 212 with the intermediate part 270 interposed therebetween, whether the external conductor 280 inputs a touch force to the conductive target 212 in a Z-axis direction, and/or the intensity of the touch force that is input to the conductive target 212 by the external conductor 280 in the Z-axis direction, and transfers the sensing information to a circuit in the user interface device 200.

The user interface device 200 may detect a gesture corresponding to whether the external conductor 280 touches the conductive target 212, whether the external conductor 280 inputs a touch force to the conductive target 212 in the Z-axis direction, and/or the intensity of the touch force that is input to the conductive target 212 by the external conductor 280 in the Z-axis direction, and may translate the detected gesture as a user input intended by the user.

Since the conductive target 212 does not need to be electrically connected to other circuits in the device 200, hardware may be simply implemented, and this is advantageous for applications requiring high airtightness and waterproofness. There is no problem with operation even when the device 200 is surrounded with a single enclosure in applications requiring high airtightness and waterproofness.

For convenience of description, the conductive target 212 located on an outer side may be referred to as a first sensing element, and the inductive coil 210 disposed to face the conductive target 212 may be referred to as a second sensing element. The inductive coil 210 may be connected to a detection circuit in the device 200.

When the external conductor 280 comes into contact with the conductive target 212, a capacitive coupling occurs between the external conductor 280 and the conductive target 212, which may affect the capacitive coupling between the conductive target 212 and the inductive coil 210. As a result, the resonant frequency of an electrical signal appearing in the inductive coil 280 may be changed by the capacitive coupling between the external conductor 280 and the inductive coil 210 via the conductive target 212, and the device 200 may detect whether the external conductor 280 comes into contact with the conductive target 212 based on a change in sensing information that appears when there is no displacement of the conductive target 212.

In this case, an exterior material 212a may be disposed on the conductive target 212. The exterior material 212a is a means for protecting the conductive target 212 and may have electrical conductivity in some cases. When the external conductor 280 comes into contact with the exterior material 212a, the capacitive coupling between the external conductor 280, the exterior material 212a, and the conductive target 212 may occur. Depending on the material of the exterior material 212a, when the external conductor 280 comes into contact with the exterior material 212a, the magnitude of a change in the capacitive coupling between the external conductor 212 and the inductive coil 210 and a change in the resonant frequency of an electrical signal appearing in the inductive coil 210 may be adjusted within an appropriate range for the device 200 to detect.

When the external conductor 280 inputs a touch force to the conductive target 212, the conductive target 212 is displaced in the Z-axis direction, and the displacement in the Z-axis direction changes the distance between the conductive target 212 and the inductive coil 210, which may directly affect the inductive coupling between the conductive target 212 and the inductive coil 210. Due to this, the resonant frequency of an electrical signal appearing in the inductive coil 210 is changed, and the device 200 may detect whether the external conductor 280 inputs a touch force to the conductive target 212 based on a change in sensing information that appears when the displacement of the conductive target 212 occurs. In addition, the device 200 may detect the intensity of a touch force that is input to the conductive target 212 by the external conductor 280 based on the magnitude of a change in sensing information based on a change in the inductive coupling between the conductive target 212 and the inductive coil 210.

When the external conductor 280 inputs a touch force to the conductive target 212, the external conductor 280 is still in contact with the conductive target 212. The change in sensing information caused by the capacitive coupling generated by the external conductor 280 touching the conductive target 212 is maintained even while the external conductor 280 inputs a touch force to the conductive target 212. Accordingly, when the external conductor 280 inputs a touch force to the conductive target 212, a contribution attributable to the intensity of the touch force is added to the change in the sensing information due to the change in the sensing information generated during the touch event of the external conductor 280.

Figure 3:
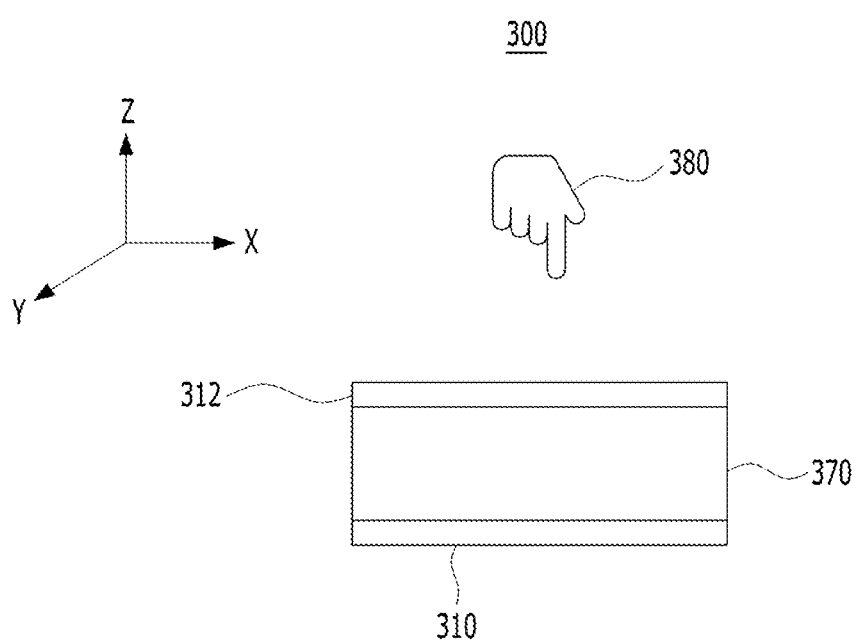
FIG. 3 is a diagram showing a user interface device based on capacitive sensing according to an embodiment of the present invention.

FIG. 3 is a diagram showing a user interface device 300 based on capacitive sensing according to an embodiment of the present invention.

Referring to FIG. 3, the inside of the user interface device 300 may be divided into one or more individual regions. At least one sensing channel may be disposed to correspond to each of the individual regions.

According to an embodiment, the inside of the user interface device 300 may be divided into a single region, a single channel may be set, and one pair of electrodes 310 and 312 may be allocated to the single channel.

The user interface device 300 includes the first electrode 312 directed toward the outside to receive user input, and a deformable intermediate part 370 located between the first electrode 312 and the second electrode 310. The intermediate part 370 is made of a material deformable by an external force, and may include, e.g., at least one of plastic, silicone, and rubber. Although a material having a high dielectric constant may be selected to increase the capacitive coupling between the first electrode 312 and the second electrode 310 and increase the sensitivity of the device 300, the sensitivity and dynamic range of the device 300 are not significantly affected by the dielectric constant of the intermediate component 370.

Although one sensing channel is shown in FIG. 3, a plurality of sensing channels may be included on an XY plane according to an embodiment of the present invention. In this case, the individual sensing channels are divided into individual regions on the XY plane, and may be disposed to correspond to the individual regions, respectively.

An external conductor 380 may approach the user interface device 300 by a user proximity motion. The second electrode 310 corresponding to each of the individual regions generates sensing information corresponding to whether the external conductor 380 touches the first electrode 312 with the intermediate part 370 interposed therebetween, whether the external conductor 380 inputs a touch force to the first electrode 312 in a Z-axis direction, and/or the intensity of the touch force that is input to the first electrode 312 by the external conductor 380 in the Z-axis direction, and transfers the sensing information to a circuit in the user interface device 300.

The first electrode 312 may be a floating electrode. In an embodiment, the first electrode 312 may also be electrically connected to the internal circuit of the device 300. However, even when the first electrode 312 is floating, a change in the capacitive coupling between the first electrode 312 and the second electrode 310 may be detected via the second electrode 310. In this case, since the first electrode 312 is floating and, thus, does not need to be electrically connected to other circuits in the device 300, hardware may be simply implemented, and this is advantageous for applications requiring high airtightness and waterproofness. There is no problem with operation even when the device 300 is surrounded with a single enclosure in applications requiring high airtightness and waterproofness.

Since the conductive target 312 does not need to be electrically connected to other circuits in the device 300, hardware may be simply implemented, and this is advantageous for applications requiring high airtightness and waterproofness. There is no problem with operation even when the device 300 is surrounded with a single enclosure in applications requiring high airtightness and waterproofness.

For convenience of description, the first electrode 312 located on an outer side may be referred to as a first sensing element, and the second electrode 310 disposed to face the first electrode 312 may be referred to as a second sensing element. The second electrode 310 may be connected to a detection circuit in the device 300.

When the external conductor 380 comes into contact with the first electrode 312, the capacitive coupling between the external conductor 380 and the first electrode 312 occurs. Due to this, the resonant frequency of an electrical signal appearing in the second electrode 310 capacitively coupled to the first electrode 312 is changed, and the device 300 may detect whether the external conductor 380 comes into contact with the first electrode 312 based on a change in sensing information that appears when there is no displacement of the first electrode 312.

When the external conductor 380 inputs a touch force to the first electrode 312, the first electrode 312 is displaced in the Z-axis direction, and the displacement in the Z-axis direction changes the interval between the first electrode 312 and the second electrode 310, which may directly affect the capacitive coupling between the first electrode 312 and the second electrode 310. Due to this, the resonant frequency of an electrical signal appearing in the second electrode 310 is changed, and the device 300 may detect whether the external conductor 380 inputs a touch force to the first electrode 312 based on a change in sensing information that appears when the displacement of the first electrode 312 occurs. In addition, the device 300 may detect the intensity of a touch force that is input to the first electrode 312 by the external conductor 380 based on the magnitude of a change in sensing information based on a change in the inductive coupling between the first electrode 312 and the second electrode 310.

When the external conductor 380 inputs a touch force to the first electrode 312, the external conductor 380 is still in contact with the first electrode 312. The change in sensing information caused by the capacitive coupling generated by the external conductor 380 touching the first electrode 312 is maintained even while the external conductor 380 inputs a touch force to the first electrode 312. Accordingly, when the external conductor 380 inputs a touch force to the first electrode 312, a contribution attributable to the intensity of the touch force is added to a change in the sensing information due to the change in the sensing information generated during the touch event of the external conductor 380.

Figure 4:
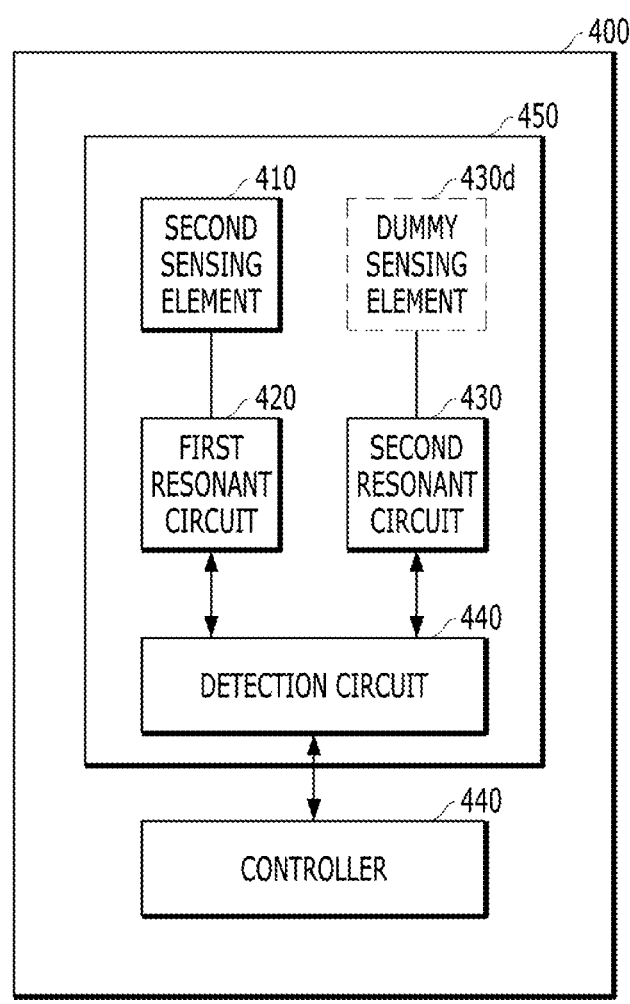
FIG. 4 is a block diagram showing the function of a hybrid sensor according to an embodiment of the present invention.

FIG. 4 is a block diagram showing the function of a hybrid sensor 450 according to an embodiment of the present invention.

A user interface device 400 includes the hybrid sensor 450 and a controller 460. The hybrid sensor 450 includes: a first resonant circuit 420; at least one second sensing element 410 electrically connected to the first resonant circuit 420; a second resonant circuit 430; at least one dummy sensing element 430d electrically connected to the second resonance circuit 430; and a detection circuit 440 configured to receive a first electrical signal formed in the first resonant circuit 420 and the at least second sensing element 410 and to receive a second electrical signal formed in the second resonant circuit 430.

The hybrid sensor 450 includes the second resonant circuit 430 having the same electrical characteristics as the first resonant circuit 420. In this case, the same electrical characteristics may refer to the same impedance or the same R-L-C configuration.

The detection circuit 440 generates sensing information by detecting the difference between the first resonant frequency of the first electrical signal and the second resonant frequency of the second electrical signal.

In this case, the sensing information includes gesture information represented by a user motion proximate to at least one of the second sensing element 410 and the first sensing element 212 or 312. The gesture information includes whether a user is proximate to the intermediate part 270 or 370 and/or the first sensing element 212 or 312, whether the user touches the first sensing element 212 or 312, whether the user inputs a touch force to the first sensing element 212 or 312, the intensity of the touch force input to the first sensing element 212 or 312 by the user, and a change in the distance between the conductor 280 or 380 and the second sensing element 410 attributable to the user motion over time, and includes information that may be translated as an user command intended by the user motion.

Recently, in combination with mobile devices, smart devices, virtual reality, and augmented reality, user interfaces aim to accurately recognize precise touch- or proximity-based user motions and gestures and to recognize users' intentions. An embodiment of the present invention proposes a technology that detects a user motion proximate to the user interface device 400 using the capacitive sensing of the prior art, in which the technology that receives a continuous real-time sensing signal based on a single operation mode attributable to a single channel and a single setting, precisely measures and quantifies a user motion based on the sensing signal, determines a user's intention, and accurately recognizes a user gesture. In this case, the single setting may refer to a case where, to prevent a single electrical characteristic, i.e., the resonant frequencies of the resonant circuits, from being changed, basic impedance is maintained as a single setting and the biases of the resonant circuits and the detection circuit 440 are not changed by the single setting.

The detection circuit 440 may output an output signal based on the magnitude and polarity of sensing information, in which case the detection circuit 440 may output the output signal as an analog signal or a digitized value.

Based on the output signal, the controller 460 may recognize whether the conductor 280 or 380 approaches the second sensing element 410 and the intermediate part 270 or 370, the distance at which the conductor 280 or 380 approaches the intermediate part 270 or 370, whether the conductor 280 or 380 comes into contact with the first sensing element 212 or 312 of the intermediate part 270 or 370, and the intensity of the touch force that is input to the first sensing element 212 or 312 by the conductor.

Although an embodiment in which the controller 460 is disposed outside the hybrid sensor 450 is shown in FIG. 4, the controller 460 may be included as a part of the hybrid sensor 450 according to another embodiment of the present invention.

The controller 460 or the hybrid sensor 450 may determine whether the sensing information and/or a change in the sensing information is caused based on the displacement of the first sensing element 212 and/or 312 attributable to a user motion based on the magnitude of the sensing information and/or the magnitude of a change in the sensing information over time.

When the sensing information and/or the change in the sensing information have a magnitude equal to or higher than a first threshold regardless of the polarity thereof, it may be determined that a significant input is made. In an embodiment, the first threshold may be set to a value varying depending on whether the sensing information and/or the change in the sensing information are positive (+) or negative (−).

When the sensing information and/or the change in the sensing information have a magnitude equal to or higher than a second threshold regardless of the polarity thereof, it is determined that the conductor 280 or 380 touches the first sensing element 212 or 312 due to a user motion. When the sensing information and/or the change in the sensing information have a magnitude higher than the second threshold and lower than the third threshold regardless of the polarity thereof, it may be determined that the first sensing element 212 or 312 is not displaced while the conductor 280 or 380 touches the first sensing element 212 or 312 due to a user motion. In an embodiment, the second threshold may be set to a value varying depending on whether the sensing information and/or the change in the sensing information are positive (+) or negative (−). The third threshold may be set when the magnitude of the sensed information and/or the change in the sensed information have either a positive (+) or a negative (−) polarity. In this section, it may be determined that the user motion touches the device 400 but does not input a touch force.

When the sensing information and/or the change in the sensing information have the polarity for which the third threshold is set and have a magnitude equal to or higher than the third threshold, it may be determined that the first sensing element 212 or 312 is displaced while the conductor 280 or 380 touches the first sensing element 212 or 312 due to a user motion. In this case, it is assumed that the displacement of the first sensing element 212 or 312 and the touch force have a high correlation with each other. The detection circuit 440 and hybrid sensor 450 of the present invention convert the sensing information (the difference between the resonant frequencies) having a high correlation with the displacement of the first sensing element 212 or 312 into an output signal and output the output signal, and the controller 460 may detect the first sensing element 212 or 312 and/or the intensity of a touch force based on the difference between the magnitude of the current output signal and the offset of the output signal. According to the result of the determination of whether the sensing information and/or the change in the sensing information over time are based on the displacement of the first sensing element 212 or 312, it may be determined whether the conductor 280 or 380 inputs a touch force to the first sensing element 212 or 312 due to a user motion. When it is determined that the conductor 280 or 380 inputs a touch force to the first sensing element 212 or 312 based on the magnitude of the sensing information and/or the change in the sensing information over time, the intensity of the touch force input to the first sensing element 212 or 312 by the conductor 280 or 380 may be determined based on the magnitude of the sensing information and/or the change in the sensed information over time.

When the movement of the conductor 280 or 380 by a user motion and/or a touch between the conductor 280 or 380 and the first sensing element 212 or 312 cause the displacement of the first sensing element 212 or 312, the presence and physical property (e.g., elasticity) of the intermediate part 270 or 370 may change the rate of change in the location of the first sensing element 212 or 312. In this case, the presence and physical property (e.g., elasticity) of the intermediate part 270 or 370 are used as important information for calculating the touch force that is input to the first sensing element 212 or 312 by the conductor 28.

Accordingly, when sensing information is provided together with information about the configuration of the sensor of the present invention including the first sensing element 212 or 312 and the intermediate part 270 or 370, the sensing information of a single channel, a single sensing mode, or a single domain may provide information about whether the conductor 270 or 370 touches the first sensing element 212 or 312, whether the conductor 280 or 380 inputs a touch force to the first sensing element 212 or 312, and the magnitude and/or change in the intensity of the touch force that is input to the first sensing element 212 or 312 by the conductor 280 or 380. According to the present invention, these pieces of information are all represented by sensing information of a single channel, a single sensing mode, or a single domain without requiring information of a plurality of channels, a plurality of sensing modes, or a plurality of time series, and may be utilized in an application layer.

The controller 460 may track whether the conductor 280 or 380 touches the first sensing element 212 or 312 due to a user motion, whether the conductor 280 or 380 inputs a touch force to the first sensing element 212 or 312, and the magnitude and/or change in the intensity of the touch force that is input to the first sensing element 212 or 312 by the conductor 280 or 380 based on the magnitude of an output signal of a single channel or single domain and/or the change of the output signal over time, and may recognize a gesture represented by the user motion based on the result of the tracking. The controller 460 may translate the gesture as a user input intended by the user motion.

The detection circuit 440 may detect the magnitude and polarity of the sensing information over time while maintaining the electrical characteristics of the first resonance circuit 420 and the second resonance circuit 430 as a single setting.

Figure 5:
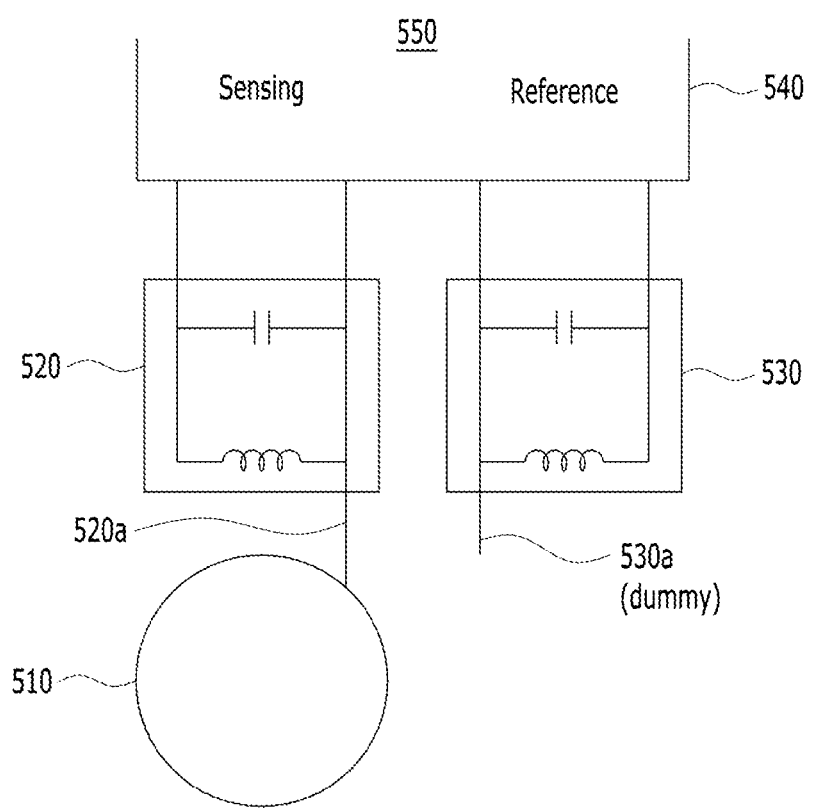
FIG. 5 is a diagram showing the differential resonant circuit of a hybrid sensor according to an embodiment of the present invention.

FIG. 5 is a diagram showing the differential resonant circuit of a hybrid sensor 550 according to an embodiment of the present invention.

Referring to FIG. 5, a detection circuit 540 receives a first electrical signal, formed in a first resonant circuit 520 and a second sensing element 510, through a sensing port 520*a*. In the same manner, the detection circuit 540 receives a second electrical signal (a reference electrical signal), formed in a second resonant circuit 530, through a reference port 530*a*. The reference port 530*a* may be connected to a dummy sensing element or may not be connected to any sensing element (a coil or an electrode).

The first resonant circuit 520 and the second resonant circuit 530 may be designed such that a first resonant frequency and a second resonant frequency (a reference resonant frequency) are maintained in the same states in the absence of an external input. Alternatively, the difference between the first resonant frequency and the second resonant frequency in the absence of an external input may be pre-measured as an offset, and a measured value may be compensated for by using the offset when a user input is sensed.

When the conductor 280 or 380 such as a user's finger or a stylus used by the user is proximate to or touches the first sensing element 212 or 312, this may change the difference between the first resonant frequency and the second resonant frequency. For example, when the user's conductor 280 or 380 approaches the first sensing element 212 or 312, the capacitance formed by the first sensing element 212 or 312 together with the conductor 280 or 380 affects the L and C values of the first resonant circuit 520, so that the first resonant frequency of the first electrical signal formed in the first resonant circuit 520 is changed. Since the approach of the conductor 280 or 380 will induce either the rise or fall of the first resonant frequency depending on the material of the conductor 280 or 380, the sensing information will have a significant magnitude with a constant polarity in response to the approach of the conductor 280.

The detection circuit 540 may detect such a difference and may determine that a significant user input has been made when detecting sensing information that exceeds a minimum threshold.

Referring back to FIGS. 4 and 5 together, the detection circuit 440 or 540 detects whether the user's conductor 280 or 380 is proximate to the first sensing element 212 or 312 by detecting information about the difference between two resonant frequencies.

In an embodiment in which the user interface device 400 or 500 is implemented, for example, to allow the user to select either a first button or a second button, the first button is implemented to correspond to a first sensing channel including the first sensing element 212 or 312 and the second button is implemented to correspond to another second sensing channel (not shown), so that it may be identified which of the first and second buttons the user intends to select. Furthermore, an effective resonant frequency change section, i.e., an effective section for measured values of the differences between resonant frequencies, in the case where the user selects either the first button or the second button is set. In this case, when a measured value that falls within the corresponding section occurs, it is considered a valid user input. In contrast, when a measured value outside the corresponding section occurs, it may be considered a change in resonant frequency attributable to a motion not intended by the user. For example, when there occurs a polarity opposite to the normal polarity that information about the difference between resonant frequencies for each channel should have according to a normal user's gesture, this may be considered a case where there is noise or another type of interference.

The detection circuit 440 or 540 may detect the magnitude and polarity of sensing information over time while maintaining the electrical characteristics (including the RLC impedance) of the first resonant circuit 420 or 520 and the second resonant circuit 430 or 530 as a single setting.

In other words, the user interface device 400 or 500 and the hybrid sensor 450 or 550 according to an embodiment of the present invention may detect the magnitude and polarity of information about the difference between resonant frequencies for each channel without requiring a change of a sensing mode and a variable frequency scan for each sampling. The user interface device 400 or 500 and the hybrid sensor 450 or 550 according to an embodiment of the present invention may obtain continuous sensing information in real time without changing the operation mode, and may provide the sensing information as a continuous analog signal value or as a digital value discrete for each sampling time upon output.

Figure 6:
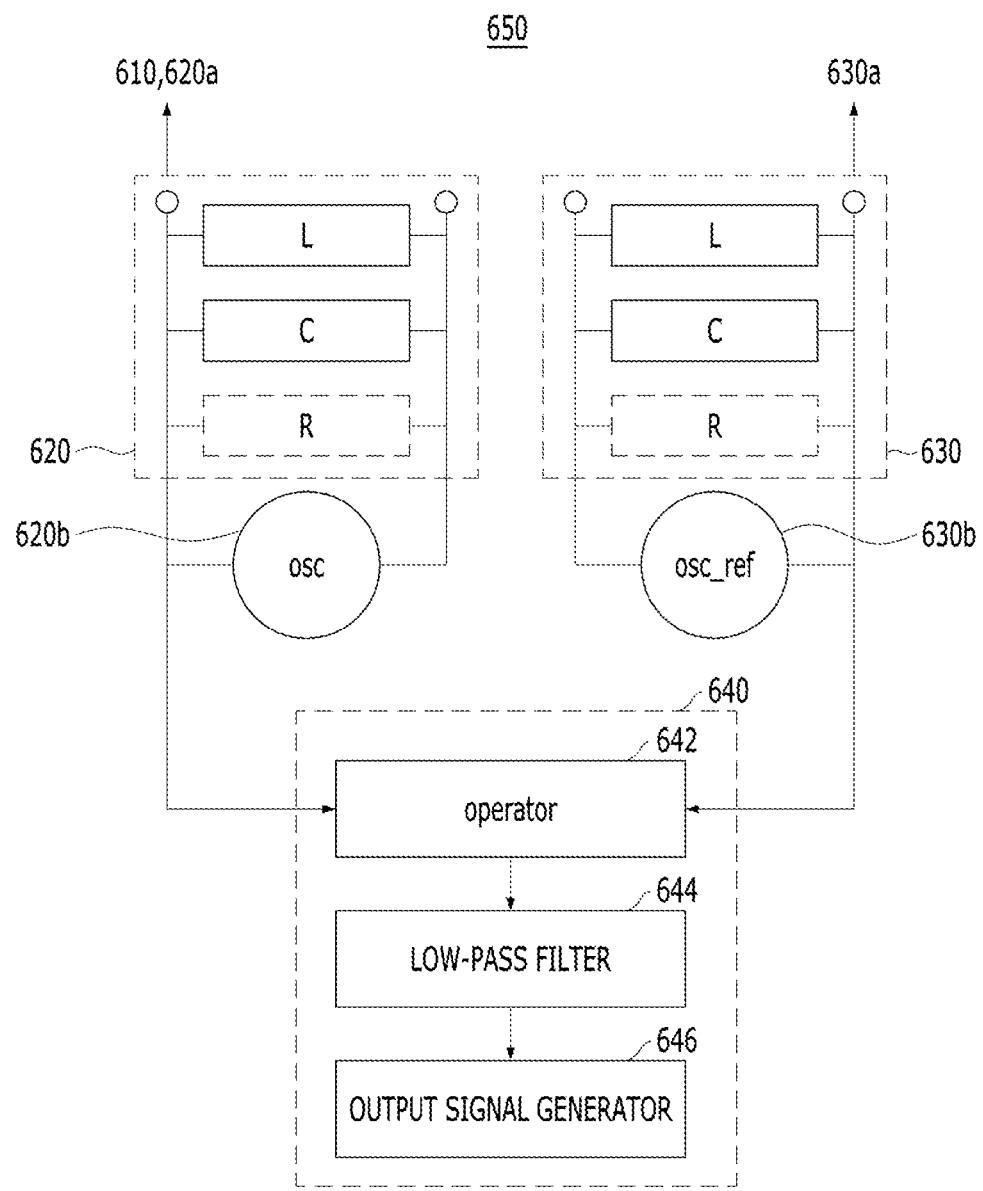
FIG. 6 is a diagram showing the detection circuit of a hybrid sensor according to an embodiment of the present invention.

FIG. 6 is a diagram showing the detection circuit 640 of a hybrid sensor 650 according to an embodiment of the present invention.

Referring to FIG. 6, a first oscillator 620b and a second oscillator 630b are disposed. Although it is recommended that the first oscillator 620b and the second oscillator 630b have the same characteristics, a difference in resonant frequency measured in the absence of user input may be compensated for by using an offset even when there is a difference in characteristics.

A first resonant circuit 620 is connected to a second sensing element 610 via a sensing port 620a and transmits a first electrical signal to a detection circuit 640. A second resonant circuit 630 transmits a second electrical signal to the detection circuit 640. The second resonant circuit 630 may be connected to a reference port 630a, but the reference port 630a does not need to be connected to another sensing element (an electrode or a coil). In another embodiment of the present invention, the second resonant circuit 630 may be connected to a dummy sensing element (not shown) having the same electrical characteristics and shape as the second sensing element 610 via the reference port 630a.

The first resonant circuit 620 and the second resonant circuit 630 shown in FIG. 6 are equivalent circuits, and do not necessarily include a lumped RLC element. For example, capacitance, inductance, and resistance may be independent elements or represent parasitic components. Furthermore, even when the first resonant circuit 620 and the second resonant circuit 630 are implemented using independent elements, the arrangement of the elements does not necessarily follow that of FIG. 6 and it is sufficient if the arrangement of the elements is equivalent to that of the circuit of FIG. 6. In addition, although it is recommended that the first resonant circuit 620 and the second resonant circuit 630 have the same electrical characteristics, a difference in resonant frequency measured in the absence of user input may be compensated for by using an offset even when there is a difference in electrical characteristics.

When a measured value obtained by eliminating the offset between the first resonant frequency and the second resonant frequency is equal to or larger than a first threshold, the detection circuit 640 may consider that any one of the first resonant frequency and the second resonant frequency has caused a significant change, and may determine that a conductor 280 or 380 is proximate to the second sensing element 610 due to a user motion. In other words, when a change in the difference between resonant frequencies is detected due to noise, unintentional movement, unintentional contact, or unintentional vibration, but is smaller than the first threshold, it may be considered that the first resonant frequency does not cause a significant change.

When the difference between resonant frequencies measured in a state where user input is not applied is not 0, a calibration process may be performed. For example, the calibration process may be performed based on the addition or adjustment of a variable resistor R' (not shown).

The related art that is contrasted with the present invention is configured to measure a change in impedance after sequentially inputting a plurality of frequency signals through a variable frequency scan. This method has the prerequisite of accurately detecting and comparing the magnitude of signals. Accordingly, there are problems in that it takes time to measure signals and power consumption is large. Furthermore, the related art has difficulty in recognizing an overall user motion changing in real time because the frequency needs to be varied for every sampling and to be measured multiple times.

The present invention may sufficiently achieve intended purposes by using changes in resonant frequency as main sensing targets instead of using the amplitudes of signals as main detection targets and also employing only a means for applying AC signals of the same frequency without adopting a method such as a variable frequency scan. Accordingly, by using this scheme, the present invention may allow a user motion to be immediately recognized from a time point when it is significantly proximate to at least one of the sensing channels, and may also allow a user motion changing in real time to be recognized without a separate sensing mode modification.

Furthermore, a change in resonant frequency is not detected in an indirect manner and the values of frequencies are directly detected, so that it is easy to generate an accurate output signal using the values. An analog signal or digital value proportional to the measured change in resonant frequency may be generated, and thus there is an advantage in that measured information may be accurately transferred to the controller 460, which is an application interface, without loss.

The detection circuit 640 of a hybrid sensor 650 according to an embodiment of the present invention may include an operator 642 configured to calculate the difference between a first resonant frequency $\omega 1$ and a second resonant frequency $\omega 2$, a low-pass filter 644 connected to the output terminal of the operator 642 and configured to eliminate high-frequency components, and an output signal generator 646 connected to the output terminal of the low-pass filter 644 and configured to generate an electrical signal proportional to quantitative information corresponding to the difference between the first resonant frequency $\omega 1$ and the second resonant frequency $\omega 2$.

The operator 642 may generate a differential resonant frequency component signal having a frequency corresponding to a differential resonant frequency $\omega 1 - \omega 2$, i.e., the difference between the first resonant frequency $\omega 1$ and the second resonant frequency $\omega 2$, by performing signal processing on a first electrical signal having the first resonant frequency $\omega 1$ and a second electrical signal having the second resonant frequency $\omega 2$. In this case, the operator 642 does not need to directly obtain the first resonant frequency $\omega 1$ or the second resonant frequency $\omega 2$. Since the frequency of the differential resonant frequency component signal obtained by the operator 642 corresponds to the differential resonant frequency $\omega 1 - \omega 2$ and is a value smaller than the first resonant frequency $\omega 1$ or the second resonant frequency $\omega 2$, a high-performance signal processing circuit is not required to process the differential resonant frequency component signal. The signal processing performed on the first electrical signal and the second electrical signal to generate the differential resonant frequency component signal may be performed in an analog domain, in a digital domain, or in an analog-digital mixed domain.

Through additional information obtained from the signal processing performed on the first electrical signal and the second electrical signal to generate the differential resonant frequency component signal or through the monitoring of the differential resonant frequency component signal over time, information about whether the differential resonant frequency $\omega 1 - \omega 2$ is positive or negative or information about which of the first resonant frequency $\omega 1$ and the second resonant frequency $\omega 2$ is higher may be obtained. Whether the information about which of the first resonant frequency $\omega 1$ and the second resonant frequency $\omega 2$ is higher is correct may be additionally verified through the monitoring of the differential resonant frequency component signal over time.

The electrical signal generated by the output signal generator 646 may have a voltage, a current, an amplitude, or a phase proportional to quantitative information corresponding to the difference between the first resonant frequency $\omega 1$ and the second resonant frequency $\omega 2$.

The output signal generator 646 according to one of the embodiments of the present invention may be a time-to-digital converter configured to generate a digitized value proportional to the frequency of the differential resonant frequency component signal, or may be an analog voltage generator configured to generate an analog signal proportional to the measured frequency difference according to another embodiment of the present invention. According to still another embodiment of the present invention, the output signal generator 646 may be an analog current generator configured to generate a current signal proportional to the measured frequency difference. In the case where the output signal is an analog voltage or an analog current, the basic offset of the analog voltage or the analog current is given when the difference between resonant frequencies is 0, and the magnitude of the output signal increases or decreases in proportion to the change in the difference between resonant frequencies.

According to an embodiment of the detection circuit 640, the detection circuit 640 may include a sampler and a comparator for a differential resonant frequency component signal. In this case, for the desirable operation of the detection circuit 640, the sampler and the comparator may be designed by selecting an operating frequency that is sufficiently higher than the first threshold and sufficiently higher than the operating range of a resonant frequency component corresponding to a detection target displacement.

In the embodiments of the present invention, the detection circuits 440 and 640 may detect the resonant frequency information of the channel independently of the amplitude of the electrical signal of the channel (without detecting the amplitude). In this case, according to another embodiment of the present invention, the related art for detecting amplitude independently of a resonant frequency may be applied additionally, and two pieces of sensing information (first sensing information based on the detection of amplitude, and first reference sensing information based on the detection of resonant frequency independent of amplitude) obtained independently of each other may be cross-verified.

Referring to the embodiments of FIGS. 2 to 6, the detection circuits 440, 540, and 640 may generate a sensing value over time by detecting the polarity and magnitude of the value of the difference between the sensing resonant frequency for each channel and the reference resonant frequency for each channel over time. The detection circuits 440, 540, and 640 may track the proximity of the conductor 280 or 380, a touch of the conductor 280 or 380, whether a touch force is input from the conductor 280 or 380, and a change in the touch force input from the conductor 280 or 380, and the movement of the location of the touch/proximity attributable to a user motion based on the sensing values over time. The controller 460 may translate the three-dimensional movement of the location of the conductor 280 or 380 attributable to the user motion as a user input intended by the user motion. Meanwhile, in an embodiment, the controller 460 and the detection circuit 440, 540, or 640 may be integrated into one integrated circuit without being separated from each other.

Figure 7:
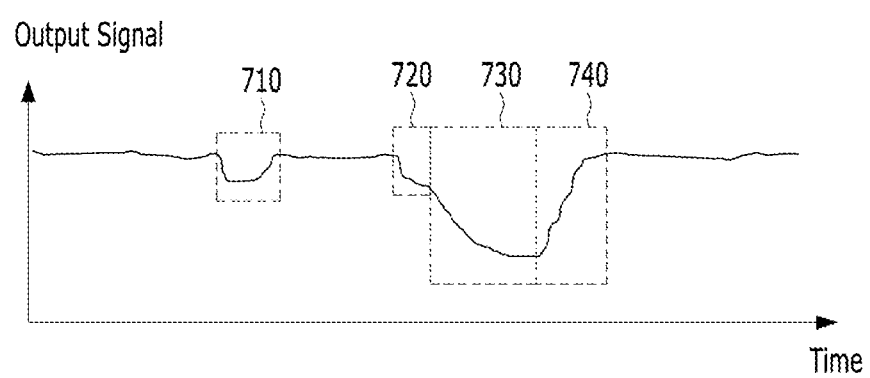
FIG. 7 is a diagram showing waveforms during the operation of a hybrid sensor according to an embodiment of the present invention.

FIG. 7 is a diagram showing waveforms during the operation of a hybrid sensor according to an embodiment of the present invention.

The user interface device 400 or 500 and the hybrid sensor 450 or 550 according to an embodiment of the present invention may detect the magnitude and polarity of information about the difference between resonant frequencies for each channel without requiring a change of a sensing mode and a variable frequency scan for each sampling. The user interface device 400 or 500 and the hybrid sensor 450 or 550 according to an embodiment of the present invention may obtain continuous sensing information in real time without changing the operation mode, and may provide the sensing information as a continuous analog signal value upon output, as illustrated in FIG. 7. According to another embodiment of the present invention, the sensing information may be provided as a digital value discrete for each sampling time.

In FIG. 7, the magnitude of a recognized signal may also be related to an area through which the human body and the first sensing element 212 or 312 face each other. Accordingly, when a part of the human body, e.g., a finger or a palm, approaches the first sensing element 212 or 312, the magnitude of a signal may vary slightly. By taking into consideration this point, a threshold for verifying whether sensing is valid may be set for each of a plurality of sections.

The first event 710 of FIG. 7 refers to an event in which a user's finger or palm touches the first sensing element 212 or 312 and is then removed from the first sensing element 212 or 312. In this case, when a change in the magnitude of the output signal occurring based on the difference in the resonant frequency of the first event 710 exceeds a first threshold, it may be determined that a significant user input has occurred. In contrast, when the change in the magnitude of the output signal exceeds a second threshold, it may be determined that a touch has occurred.

Referring to the waveforms of FIG. 7, the changes in the magnitude of the output signal are clearly exhibited to the extent that a case where the first sensing element 212 or 312 is touched, a case where the first sensing element 212 or 312 is not touched, a case where the first sensing element 212 or 312 is touched but a touch force is not input, and a case where a touch force is input can be sufficiently distinguished from one another.

The next second event 720 shown in FIG. 7 refers to a case where a user's finger or palm touches the first sensing element 212 or 312. Next, a third event 730 refers to a case where a user's finger or palm inputs a touch force to the first sensing element 212 or 312, so that the magnitude of the change in the output signal continues to increase (the change has a negative (−) polarity, so that the output signal continues to decrease). In the third event 730, it can be seen that the user continues to increase the touch force over time.

In a fourth event 740, there is shown the waveform of an output signal when a user removes a finger or palm from the first sensing element 212 or 312. In this case, it may be understood that the boundary between the second event 720 and the third event 730 is shown based on a third threshold adapted to determine whether a touch force is input.

Depending on the area or shape of the first sensing element 212 or 312, the pattern of capacitance formed when the conductor 280 or 380 is proximate due to a user motion may appear different. In this case, the first sensing element 212 or 312 may assume a shape other than a rectangle or a circle depending on an application by taking into consideration the size/area and/or shape of the conductor 280 or 380.

In this case, all the situations in which the conductor 280 or 380 approaches the individual first sensing element 212 or 312 within a predetermined distance may be detected based on a sensing value section for each preset individual location region, so that proximity itself may be detected regardless of whether a user is proximate to the device 200 or 300 without any contact or is in contact with the device 200 or 30.

Furthermore, the amount of change in capacitance and the amount of change in the resonant frequency may vary depending on whether the conductor 280 or 380 used by the user is a part of the human body or another conductive object such as a stylus. Accordingly, as to the detection value section for each individual location area, not only one section is set for each individual first sensing element 212 or 312, but a plurality of detection value sections may be set to correspond to a plurality of material types that the conductor 280 or 380 may have.

The present invention has a fast response speed because it may track a user motion only through a single measurement at every point in time without a frequency scan, unlike the related art, so that the present invention may track a user motion in real time.

The present invention may cover a wide location area around the device 200 or 300 using a single-channel sensor, so that the cost of an integrated circuit may be reduced, and so that power may be reduced during the operation of the sensor, with the result that the present invention may be used more effectively even when a mobile device or a battery is used.

In an embodiment in which a plurality of individual regions is provided and a channel is formed for each of the individual regions, inter-channel interference may occur. Accordingly, in an embodiment of the present invention, the spacing between channel reference resonant frequencies may be set to prevent interference between channels. Since a reference resonant circuit and a sensing resonant circuit are set to have the same electrical characteristics for each channel, the channel frequency spacing is also applied to the sensing resonant circuit in the same manner.

Furthermore, through calibration, the amplitude of a signal may be normalized based on the distance at which a part of the human body is proximate to a channel region corresponding to each channel.

Figure 8:
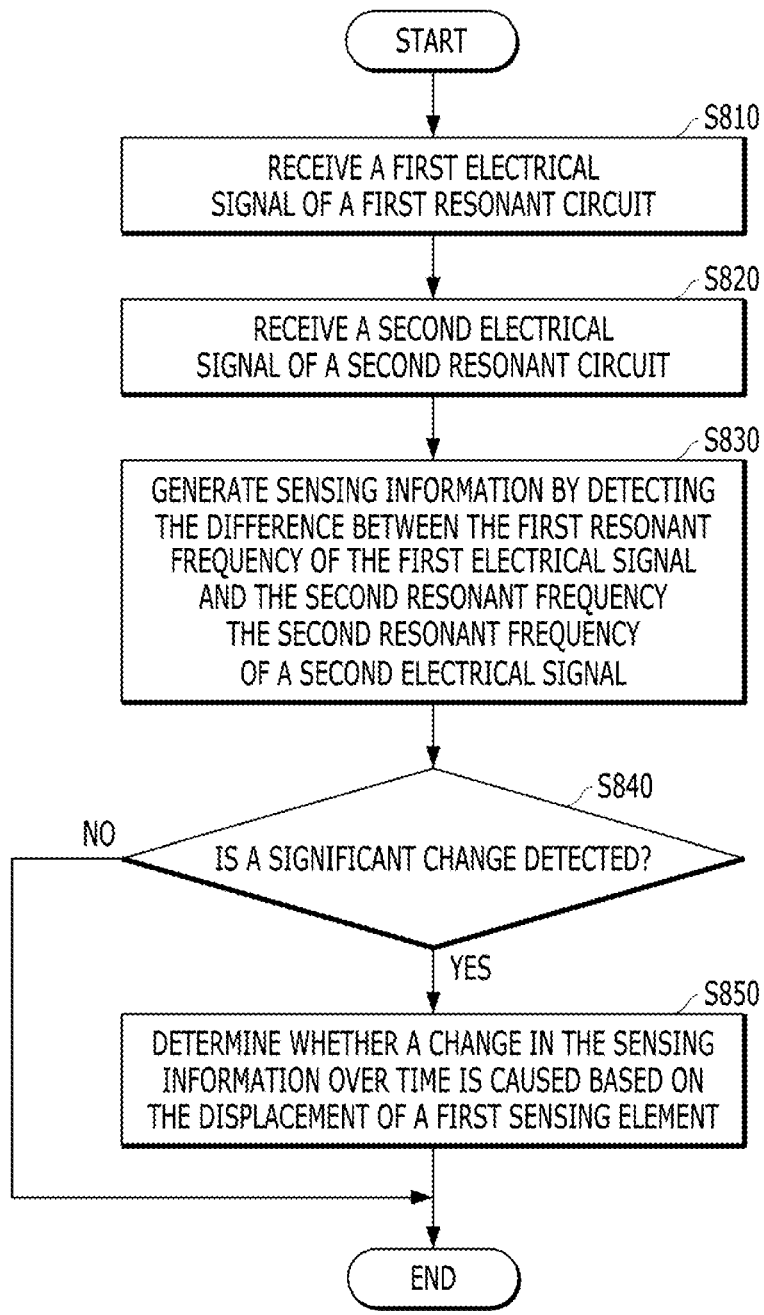
FIG. 8 is an operation flowchart showing a method of operating a hybrid sensor according to an embodiment of the present invention.

FIG. 8 is an operation flowchart showing a method of operating the hybrid sensor according to an embodiment of the present invention.

The operation method of FIG. 8 may be performed in the embodiments of FIGS. 2 to 7, and may be performed by program instructions loaded and executed by the processor or the controller.

The operation method of FIG. 8 includes: step S810 of receiving, by the detection circuit, a first electrical signal formed in the first resonant circuit and the at least one second sensing element electrically connected to the first resonant circuit; step S820 of receiving, by the detection circuit, a second electrical signal formed in the second resonant circuit (a reference); and step S830 of detecting, by the detection circuit, the difference between the first resonant frequency of the first electrical signal and the second resonant frequency of the second electrical signal.

In this case, the operation method may further include the step S850 of detecting, by the detection circuit and/or the controller, whether a user motion over time approaches the device 200 or 300, whether the user motion over time touches the device 200 or 300, whether the user motion over time inputs a touch force to the device 200 or 300, and a change in the touch force input to the device 200 or 300, tracking, by the detection circuit and/or the controller, the results of the detection, and recognizing, by the detection circuit and/or the controller, gesture information represented by a user motion proximate to the device 200 or 300 based on the results of tracking. For example, at step S850, it may be determined whether a change in sensing information is caused based on the displacement of the first sensing element 212 or 312 based on the magnitude of the change in sensing information over time.

In this case, there may be performed step 840 of determining, by the detection circuit and/or the controller, whether a significant change is detected by determining whether the result of step S830 exceeds a first threshold.

The operation method of the present invention may further include the step (not shown) of translating, by the detection circuit or the controller, the movement of the location of a touch or proximity of a conductor based on the user motion as a user input intended by the user motion. Since a detailed example of the process of translating a user motion as a user input may be easily derived by those of ordinary skill in the art from the configurations of the related art documents cited above, a detailed description thereof will be omitted.

The embodiments of the present invention shown in FIGS. 2 to 8 may be applied to various applications. For example, as an embodiment of the present invention, there may be assumed a case where an input can be made by only one button because a device is surrounded with a single enclosure and there is no separate user input. In this case, the device provides high waterproofness, airtightness and safety, but it is difficult to provide the convenience of functionality according to the related art. For example, the present invention may implement a plurality of functions with a single button. For example, a plurality of functions ranging from power-on to other specific operations may be implemented based on the single mode of a single channel.

As an embodiment of the present invention, a motion controller interface may be mentioned as an example. A conventional interface related with this may include a game interface based on a motion controller. An embodiment of the present invention may be applied to improve the conventional motion controller interface.

A motion controller interface according to an embodiment of the present invention may deactivate power and wait in a sleep state when a touch of a part of a human body is not detected on a button. The motion controller interface according to the present embodiment may detect a case where a hand or a finger lightly touches the button to such an extent that the deformation of the intermediate part 270 or 370 does not occur, may activate the power, and may wait in a stand-by state.

The motion controller interface according to the present embodiment may determine that a case where a user inputs a pressing force to such an extent that the deformation of the intermediate part 270 or 370 occurs corresponds to an input intended by a user, and may provide feedback in response to the input intended by the user. In this case, the motion controller interface according to the present embodiment may measure whether a pressing force intended by a user is input, and the intensity of the pressing force intended by the user.

Meanwhile, the condition of activating power in the motion controller interface according to the present embodiment and waiting in a stand-by state may be set to a case in which approach is maintained for a predetermined time after a user's approach is detected within a threshold distance from the button.

As another embodiment of the present invention, an example of being applied as a motion controller interface for a vehicle, such as a motion controller interface for the steering wheel of a vehicle or a motion controller interface for the driver information system (DIS) of a vehicle, may be mentioned.

The motion controller interface for a vehicle according to the present embodiment may operate like a motion controller interface for a game machine, and may provide information about the approach of a user's body part, a touch of the user's body part, whether a pressing force intended by the user is input, and information about the intensity of the pressing force intended by the user to an application layer.

As an embodiment of the present invention, there may be provided an ON/OFF switch interface in which safety is taken into consideration. The switch interface according to the present embodiment may be disposed to be selectively turned on and off at a location that is touched by a hand.

The switch interface according to the present embodiment may be applied as an embodiment that is activated only in the case where a user inputs a touch force and also maintains the touch force for a predetermined period (e.g., one second) or longer for safety when the switch interface is turned on. This type of interface may be applied to the operation of a gas valve, a fire-hazardous heating appliance, or the like.

In contrast, a case where a user desires to deactivate a device may be a relatively safe case, so that the device may be turned off only by a touch of the user on the button.

According to an embodiment of the present invention, there may also be applied a modified embodiment in which a user's gestures are registered or promised in advance and thus a device is activated with two consecutive touch forces and deactivated with one touch force.

Since the embodiment of the present invention detects a change in the resonant frequency instead of a change in the amplitude of a signal, a high dynamic range is provided even when considerable changes in sensing information and an output signal may occur from the time when the external conductor approaches the first sensing element until the displacement of the first sensing element occurs, and thus the embodiment may sufficiently deal with the above case by using a single channel and a single operation mode. In other words, the dynamic range in which a difference in resonant frequency can be detected in response to the interaction between the external conductor and the first sensing element is larger than the dynamic range in which the conventional sensor can detect a change in amplitude, so that a wide detectable operation range is provided.

Furthermore, although there may be a disclosure in which the dynamic range of a capacitive proximity sensor is intentionally modified significantly among the related art, this case is problematic in that the precision and accuracy of measurement are remarkably deteriorated.

The present invention may provide information about the distance at which the external conductor is proximate to the outer contact surface of the intermediate part, whether the external conductor is in contact with the outer contact surface of the intermediate part, the touch force that is input to the outer contact surface of the intermediate part by the external conductor, whether the external conductor inputs a touch force to the outer contact surface of the intermediate part, and the intensity of the touch force that is input to the outer contact surface of the intermediate part by the external conductor by using the single channel sensor.

The reasons for this are that the resonant frequency difference detection technique of the present invention has a considerably wider dynamic range, in which an operating range attributable to the interaction between the external conductor and the first sensing element can be detected, than the amplitude change detection techniques of the related art and the precision and accuracy of measurement are not degraded in spite of the provision of the wider dynamic range.

Accordingly, the present invention provides high measurement precision while the external conductor approaches the outer contact surface of the intermediate part. Furthermore, even when the distance between the external conductor and the second sensing element becomes shorter while the outer contact surface of the intermediate part is deformed after the external conductor comes into contact with the outer contact surface of the intermediate part, considerably high measurement accuracy may be provided. The present invention provides a wide dynamic range while maintaining high precision and accuracy. Based on these characteristics, the present invention may provide information about the approach of the external conductor, a touch of the external conductor, the touch force of the external conductor, and the intensity of the touch force via the single channel sensor. These characteristic of the present invention are significantly differentiated from the related art.

According to the present invention, a change in impedance attributable to the deformation of the intermediate part or the exterior material may be recognized, and also even the aspect in which a user's body part approaches from the outside of the exterior material may be identified via a single channel. In addition, the capacitive proximity sensor and the mechanical push detection button may be combined into one embodiment implemented by a single channel, rather than simply replacing a mechanical/capacitive button.

In order to overcome the problems of the related art and detect the approach of the body part conductor, the detection of an approximate distance, a touch event, a pressing event, and the intensity of a pressing force via a single channel, it is necessary to provide a wide dynamic range while maintaining high sensitivity, precision, and accuracy. The present invention may deal with a considerably wide dynamic range while maintaining high resolution by detecting the difference between frequencies instead of amplitude for which a dynamic range is easily limited.

The present invention intended to detect the difference between resonant frequencies may use a wide frequency band, and may thus easily deal with the wide dynamic range of a physical quantity to be detected. Furthermore, in this process, the detection circuit may be easily optimized without degrading the detection resolution, precision, accuracy, or sensitivity of the detection circuit.

According to the present invention, whether a user makes a touch, whether the user inputs a touch force, and the intensity of the touch force may be detected and also changes in the touch and the touch force may be tracked as a gesture over time via the hybrid sensor configuration based on a single channel and a single operation mode, so that a user motion input to a device may be accurately detected via the single operation mode of the single channel sensor.

According to the present invention, power consumption and sensing time may be reduced by detecting whether a user touches an individual region, whether the user inputs a touch force, and the intensity of a touch force through single measurement without a frequency component scan.

According to the present invention, there may be provided the user interface for detecting changes in time and frequency domains and recognizing a gesture using the hybrid sensor of a single channel and a single operation mode. According to an embodiment of the present invention, changes in time and frequency domains may be easily detected without requiring a variable frequency scan, and also it is not necessary to change an operation mode according to a target to be detected, thereby obtaining continuous sensing information in real time while maintaining the setting of the sensing circuit as a single setting.

According to an embodiment of the present invention, the details of the user motion (whether a user makes a touch, whether the user inputs a touch force, and the intensity of the touch force) for an individual region may be rapidly detected through real-time continuous sensing. The user interface according to an embodiment of the present invention may rapidly detect and translate a gesture represented by a user motion and an input intended by a user.

The user interface according to an embodiment of the present invention may rapidly detect various aspects of a user motion through single setting-based sensing, and, thus, may rapidly detect and translate a gesture represented by the user motion and an input intended by a user According to an embodiment of the present invention, information detected using the hybrid sensor of a single channel and a single operation mode is output as a quantified value, so that whether there is an error in a sensing result may be verified by comparing the value with a predetermined measured value section. According to an embodiment of the present invention, whether a conductor (including a part of the human body) touches the external contact surface of the sensor due to a user motion and/or whether a user inputs a touch force may be determined, and whether the result of the determination is caused by a user's intention or an error may be verified.

Since the related art detects the amplitude of a resonant signal or the amplitude of an analog AC signal, only whether a detected result exceeds a predetermined threshold value can be detected. In contrast, since the present invention calculates the resonant frequency difference of a differential signal and generates an analog signal or digitized value proportional to the resonant frequency difference, quantified sensing information may be obtained. Using this, changes in a touch/proximity location in a time-three-dimensional space may be precisely detected based on the sensor of a single channel and a single operation mode.

A method of operating a circuit, a sensor, and/or a user interface device according to an embodiment of the present invention may be implemented in the form of program instructions executable by a variety of computing means and then recorded in a computer-readable storage medium. The computer-readable storage medium may include program instructions, data files, and data structures solely or in combination. Program instructions recorded in the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. These hardware devices may be configured to operate as one or more software modules in order to perform the operation of the present invention, and the vice versa.

However, the present invention is not limited to the embodiments. Like reference symbols in the drawings designate like components. The lengths, heights, sizes, widths, etc. introduced in the embodiments and drawings of the present invention may be exaggerated to help to understand the present invention.

Although the present invention has been described with reference to specific details such as the specific components, and the limited embodiments and drawings, these are provided merely to help a general understanding of the present invention, and the present invention is not limited thereto. Furthermore, those having ordinary skill in the art to which the present invention pertains may make various modifications and variations from the above detailed description.

Therefore, the spirit of the present invention should not be defined based only on the described embodiments, and not only the attached claims but also all equivalents to the claims should be construed as falling within the scope of the spirit of the present invention.

What is claimed is:

1. A hybrid sensor comprising:
   a first sensing element located on an outer side of the hybrid sensor;
   a second sensing element disposed to face the first sensing element;
   a deformable intermediate part disposed between the first sensing element and the second sensing element;
   a first resonant circuit electrically connected to the second sensing element;
   a second resonant circuit; and
   a detection circuit configured to receive a first electrical signal formed in the first resonant circuit and the second sensing element, and a second electrical signal formed in the second resonant circuit,
   wherein the detection circuit is further configured to generate sensing information by detecting a difference between a first resonant frequency of the first electrical signal and a second resonant frequency of the second electrical signal,
   wherein whether the sensing information is caused based on a displacement of the first sensing element attributable to a user motion is determined based on a magnitude of the sensing information,
   wherein the first sensing element is a conductive target and the second sensing element is an inductive coil,
   wherein the sensing information is affected by capacitive coupling between the inductive coil and an external conductor passing through the conductive target when the change in the sensing information is not caused based on the displacement of the first sensing element, and
   wherein the sensing information is affected by inductive coupling between the conductive target and the inductive coil when the change in the sensing information is caused based on the displacement of the first sensing element.

2. The hybrid sensor of claim 1, wherein whether an external conductor inputs a touch force to the first sensing element due to the user motion is determined based on a result of the determination of whether the sensing information is caused based on the displacement of the first sensing element attributable to the user motion, which is performed based on the magnitude of the sensing information when the external conductor touches the first sensing element due to the user motion.

3. The hybrid sensor of claim 2, wherein an intensity of the touch force input to the first sensing element by the external conductor is determined based on the magnitude of the sensing information when the external conductor inputs the touch force to the first sensing element.

4. The hybrid sensor of claim 1, wherein the detection circuit is further configured to output an output signal proportional to the magnitude of the sensing information while having a value that is affected by a polarity of the sensing information.

5. The hybrid sensor of claim 1, further comprising a controller configured to:
   determine whether the change in the sensed information is caused based on the displacement of the first sensing element attributable to the user motion based on the magnitude of the sensing information; and
   determine whether an external conductor inputs a touch force to the first sensing element due to the user motion based on a result of the determination of whether the sensing information is caused based on the displacement of the first sensing element attributable to the user motion, which is performed based on the magnitude of the sensing information when the external conductor touches the first sensing element due to the user motion.

6. The hybrid sensor of claim 1, wherein the detection circuit is further configured to detect a magnitude of the sensing information over time while maintaining the electrical characteristics of the first resonant circuit and the second resonant circuit as a single setting.

7. The hybrid sensor of claim 1, wherein the detection circuit comprises:
   an operator configured to obtain the difference between the first resonant frequency and the second resonant frequency;
   a low-pass filter connected to an output terminal of the operator, and configured to remove a high frequency component; and
   an output signal generator connected to an output terminal of the low-pass filter, and configured to generate an electrical signal proportional to a magnitude of the sensing information according to a polarity thereof.

8. A hybrid sensor comprising:
   a first sensing element located on an outer side of the hybrid sensor;
   a second sensing element disposed to face the first sensing element;
   a deformable intermediate part disposed between the first sensing element and the second sensing element;
   a first resonant circuit electrically connected to the second sensing element;
   a second resonant circuit; and
   a detection circuit configured to receive a first electrical signal formed in the first resonant circuit and the second sensing element, and a second electrical signal formed in the second resonant circuit,
   wherein the detection circuit is further configured to generate sensing information by detecting a difference between a first resonant frequency of the first electrical signal and a second resonant frequency of the second electrical signal, and
   wherein whether the sensing information is caused based on a displacement of the first sensing element attributable to a user motion is determined based on a magnitude of the sensing information,
   wherein the first sensing element is a floating first electrode,
   wherein the second sensing element is a second electrode,
   wherein the sensing information is affected by capacitive coupling between an external conductor approaching due to the user motion and the first electrode when the change in the sensing information is not caused based on the displacement of the first sensing element, and
   wherein the sensing information is affected by capacitive coupling between the first electrode and the second electrode when the change in the sensing information is caused based on the displacement of the first sensing element.

9. A user interface device comprising:
   a hybrid sensor; and
   a controller,
   wherein the hybrid sensor comprises:
   a first sensing element located on an outer side of the hybrid sensor;
   a second sensing element disposed to face the first sensing element;
   a first resonant circuit electrically connected to the second sensing element;
   a second resonant circuit;
   a deformable intermediate part disposed between the first sensing element and the second sensing element; and
   a detection circuit configured to receive a first electrical signal formed in the first resonant circuit and the second sensing element, and a second electrical signal formed in the second resonant circuit,
   wherein the detection circuit is further configured to generate sensing information by detecting a difference between a first resonant frequency of the first electrical signal and a second resonant frequency of the second electrical signal, and
   wherein the controller is configured to:
      determine whether the sensing information is caused based on a displacement of the first sensing element attributable to a user motion based on a magnitude of the sensing information; and
      track whether an external conductor inputs a touch force to the first sensing element due to the user motion based on a result of the determination of whether the sensing information is caused based on the displacement of the first sensing element attributable to the user motion, which is performed based on the magnitude of the sensing information over time when the external conductor touches the first sensing element due to the user motion.

10. The user interface device of claim 9, wherein the controller is further configured to:
    recognize a gesture represented by the user motion based on a result of the tracking; and
    translate the gesture as a user input intended by the user motion.

11. The user interface device of claim 10, wherein the controller is further configured to:
    determine an intensity of the touch force, input to the first sensing element by the external conductor, based on the magnitude of the sensing information over time when the external conductor inputs the touch force to the first sensing element;
    recognize a gesture represented by the user motion based on the intensity of the touch force; and
    translate the gesture as a user input intended by the user motion.

12. A method of operating a hybrid sensor, the method comprising:
    receiving, by a detection circuit, a first electrical signal formed in a first resonant circuit and a second sensing element electrically connected to the first resonant circuit and disposed to face a first sensing element;

receiving, by the detection circuit, a second electrical signal formed in a second resonant circuit;

generating, by the detection circuit, sensing information by detecting a difference between a first resonant frequency of the first electrical signal and a second resonant frequency of a second electrical signal;

determining, by a controller or the detection circuit, whether the sensing information is caused based on a displacement of the first sensing element attributable to a user motion based on a magnitude of the sensing information, and tracking, by the controller, whether an external conductor inputs a touch force to the first sensing element due to the user motion based on a result of the determination of whether the sensing information is caused based on the displacement of the first sensing element attributable to the user motion, which is performed based on the magnitude of the sensing information over time when the external conductor touches the first sensing element due to the user motion.

13. The method of claim 12, further comprising:

outputting, by the detection circuit, an output signal proportional to the magnitude of the sensing information while having a value that is affected by a polarity of the sensing information;

recognizing, by the controller, a gesture represented by the user motion based on a result of the tracking; and translating, by the controller, the gesture as a user input intended by the user motion.

14. The method of claim 13, further comprising, determining, by the controller, an intensity of the touch force input to the first sensing element by the external conductor based on the magnitude of the sensing information over time when the external conductor inputs the touch force to the first sensing element, wherein the recognizing comprises recognizing the gesture based on the intensity of the touch force.

* * * * *